(12) United States Patent  (10) Patent No.: US 9,004,806 B2
Chau  (45) Date of Patent: Apr. 14, 2015

(54) SHEET SECURING SCAFFOLD CLAMP

(75) Inventor: Alexander Chau, St. Albert (CA)

(73) Assignees: SH Welding & Repair Ltd. (CA); Mutaz Hashem (CA)

( * ) Notice: Subject to any disclaimer, the term of this patent is extended or adjusted under 35 U.S.C. 154(b) by 48 days.

(21) Appl. No.: 13/551,345

(22) Filed: Jul. 17, 2012

(65) Prior Publication Data

US 2013/0272784 A1   Oct. 17, 2013

Related U.S. Application Data

(60) Provisional application No. 61/623,813, filed on Apr. 13, 2012.

(51) Int. Cl.
| | | |
|---|---|---|
| *F16B 5/06* | (2006.01) | |
| *E04G 5/12* | (2006.01) | |
| *F16L 37/12* | (2006.01) | |
| *E04G 7/14* | (2006.01) | |

(52) U.S. Cl.
CPC .............. *E04G 5/12* (2013.01); *Y10T 403/648* (2015.01); *Y10T 403/535* (2015.01); *Y10T 403/7064* (2015.01); *F16L 37/123* (2013.01); *E04G 7/14* (2013.01)

(58) Field of Classification Search
CPC .............. E04G 5/12; E04G 7/14; F16D 1/00; F16L 37/123; F16B 2/14
USPC .............. 403/204, 286, 289, 293, 338, 374.1, 403/374.3, 314, 290; 248/229.11, 229.12, 248/229.21, 230.2; 24/268, 510, 515, 536, 24/270, 19; 249/46; 285/198, 367
See application file for complete search history.

(56) References Cited

U.S. PATENT DOCUMENTS

| | | | | |
|---|---|---|---|---|
| 978,398 | A * | 12/1910 | Rischard | 24/339 |
| 2,168,990 | A * | 8/1939 | Hungerford | 249/46 |
| 2,449,864 | A * | 9/1948 | Symons | 249/190 |
| 2,975,904 | A * | 3/1961 | Krebs et al. | 211/46 |
| 3,179,212 | A * | 4/1965 | Gostling | 52/646 |
| 3,695,638 | A * | 10/1972 | Blakeley | 285/112 |
| 3,707,304 | A * | 12/1972 | Gostling | 403/293 |
| 3,926,531 | A * | 12/1975 | Gostling | 403/293 |
| 3,964,773 | A * | 6/1976 | Stade et al. | 285/367 |
| RE28,912 | E * | 7/1976 | Stade et al. | 285/367 |
| 3,977,647 | A * | 8/1976 | Williams | 249/191 |
| 3,996,650 | A * | 12/1976 | Tonn | 160/52 |
| 4,566,819 | A * | 1/1986 | Johnston | 403/385 |
| 4,632,221 | A * | 12/1986 | Stanford | 182/186.8 |
| 5,046,695 | A * | 9/1991 | Vuorenmaa | 248/230.2 |
| 5,172,877 | A * | 12/1992 | Hattori et al. | 248/68.1 |
| 5,921,696 | A * | 7/1999 | Gillotti | 403/109.1 |
| 6,607,219 | B2 * | 8/2003 | Mirales et al. | 285/236 |
| 6,702,509 | B2 * | 3/2004 | Rogers | 403/385 |
| 8,043,022 | B2 | 10/2011 | Chau | |
| 2006/0291956 | A1 * | 12/2006 | Chau | 403/384 |

* cited by examiner

*Primary Examiner* — Daniel P Stodola
*Assistant Examiner* — Matthew R McMahon
(74) *Attorney, Agent, or Firm* — Sheridan Ross P.C.

(57) ABSTRACT

An elongated clamp for securing a flexible fabric-like shroud to a scaffold support member including two opposed jaws movable between an open and closed position by a one pin and an at-least-one wedge combination. The flexible shroud is held to the support member by the clamp's gripping force. Multiple clamps securable at different points along the various standard support members can provide positive securement of the shroud.

11 Claims, 12 Drawing Sheets

SHEET SECURING SCAFFOLD CLAMP

CROSS REFERENCE TO RELATED APPLICATIONS

This application claims priority of U.S. Provisional Patent Application Ser. No. 61/623,813, entitled "Sheet Securing Scaffold Clamp", filed Apr. 13, 2012, and hereby incorporates the same provisional application by reference herein in its entirety.

TECHNICAL FIELD

The present application relates to an elongate clamp for use with scaffolding and the securement of a sheet material to a scaffold support.

BACKGROUND

Scaffolding is commonly used to provide a work platform at a raised height and allows safe repair or maintenance of a structure. For some applications, scaffolding is used in association with preventative maintenance associated with a particular building or structure and the length of time the scaffolding remains in place can be relatively long. Depending upon the particular project and environment, it is sometimes necessary to provide shrouding to the exterior of the scaffolding to provide a wind or weather block. Heavier shrouding can be used to protect a worker from unnecessary exposure to wind, rain and/or snow.

Various methods have been proposed for attaching of a sheet material to the exterior of the scaffolding. According to one system, a specialized fabric shrouding with a series of ports therein are designed to be connected on posts provided on the scaffolding. This system requires both a specialized shrouding as well as customized scaffolding. Typically, there are a number of different types of scaffolding and only a relatively small portion of the scaffolding on hand may require shrouding. Furthermore, scaffolding is used in many different configurations and any system for securing shrouding requires flexibility with respect to securement locations and ease of securement. Therefore, although specialized securing methods and approaches have been proposed they have not proven to be particularly effective.

It is known to provide a sheet securing scaffold clamp as in U.S. Pat. No. 8,043,022, incorporated by reference herein in its entirety. This clamp, however, has its own shortcomings. It is unable to open wide enough to accommodate shrouding made of heavy materials/fabrics; it is difficult to remove the clamp in a manner without damaging the shroud material; and when exposed, the unrounded metal edges of the clamp lead to damage of the shroud material.

There remains a need to provide a simple effective approach for securing a fabric shroud to scaffolding in a manner that can overcome the shortcomings of the prior art, accommodate shrouding made of heavy materials, and reduce damage to the shroud fabric.

SUMMARY

An elongate clamp is provided for use in securing a sheet material as a shroud to a tubular scaffold support member, said elongate clamp comprising first and second opposed jaw members having a gap therebetween on one side to allow a tubular scaffold member to be received in a securement cavity defined by said opposed jaw members. Each jaw member can comprise an engagement flange in an overlapping relationship with the engagement flange of the other jaw member to maintain said jaw members in opposed relation. The jaw members can be adjustably pin-secured in an open or closed condition by a pin and wedge combination. In some embodiments, the pin and wedge combination can comprise a single pin and one or two wedges. The one pin and two wedge combination can be retained on both flanges and positioned such that the two jaw members are aligned. The wedges of the one pin and two wedge combination can be moveable from a released position, where the jaws can be separated to increase the opening on the one side for receiving a scaffold support member, to a closed position, where at least one wedge and the pin draws the jaws towards one another to effect gripping about a scaffold support member between the jaws, for example where one wedge is positioned substantially perpendicular to the pin in a horizontal plane and the second wedge is positioned substantially perpendicular to the pin in a vertical plane.

In some embodiments, the elongate clamp can comprise a resilient compressive layer lining each jaw and defining an interior surface of each jaw. The lining can extend past the end of the jaws in some embodiments to protect the shroud material from potentially tearing on the corners of the jaws. In some embodiments, the corners of the jaws can be rounded to protect the shroud material from potentially tearing on the corners of the jaws.

In further embodiments, the pin can be dimensioned to allow for the opening to define a gap between the jaws that allows for the clamp to receive a shroud of thick/heavy material in an open position and engage the shrouding of thick/heavy material and a support member, maintaining the shrouding in engagement with the support member, in a closed position.

In further embodiments, each wedge can comprise a center slot running between opposed ends of the wedge, and the pin associated with the wedge passing through the center slot and capturing the wedges on opposite ends of the pin.

In further embodiments, the one pin and two wedge combination can be located in the center of the engagement flanges. In some embodiments, the wedges can be located on opposite sides of the clamp.

In further embodiments, the clamp can be reversible in orientation.

In further embodiments, each wedge can be pivotally supported on the engagement flanges and can be rotatable to allow alignment of the wedges along the engagement flanges or across the engagement flanges and in either configuration are used to effect movement of the jaws towards one another.

This particular arrangement can allow for either wedge to be positioned substantially perpendicular to the pin in a horizontal plane and the other wedge to be positioned substantially perpendicular to the pin in a vertical plane when the clamp is in a closed position. The clamp can then be opened by adjusting the wedge substantially perpendicular to the pin, thereby ameliorating the difficulty of removing the clamp without damaging the shroud.

Broadly stated, in some embodiments, an elongate shroud securing scaffold clamp for use in securing a shroud material to a tubular scaffold member is provided, said clamp comprising: first and second opposed jaw members opening on one side to receive said tubular scaffold member therebetween; each jaw member on a side opposite said one side, including an engagement flange in overlapping relationship with the engagement flange of the other jaw member, said jaw members being adjustably secured in opposed relationship by a pin and wedge combination, said combination comprising a single pin; said pin and wedge being retained at one end of said opposed engagement flanges, said wedge being movable from a release position where the jaws can be separated to provide an opening between said jaw members on said one side to a closed position where said pin and wedge draw said jaws towards one another to effect gripping about said tubular scaffold member inserted between said jaws, wherein said pin and wedge is pivotally supported in said engagement flanges and rotatable to allow alignment of said wedge along said engagement flanges or across said engagement flanges to effect movement of jaws towards one another, said wedge when positioned across said engagement flange being movable to engage one of said jaw members at a position spaced from said engagement flange and urge the jaw member to said closed position.

DETAILED DESCRIPTION OF EMBODIMENTS

Apparatuses for use with scaffolding and the securement of a shroud sheet to a scaffold support are provided.

Figure 1:
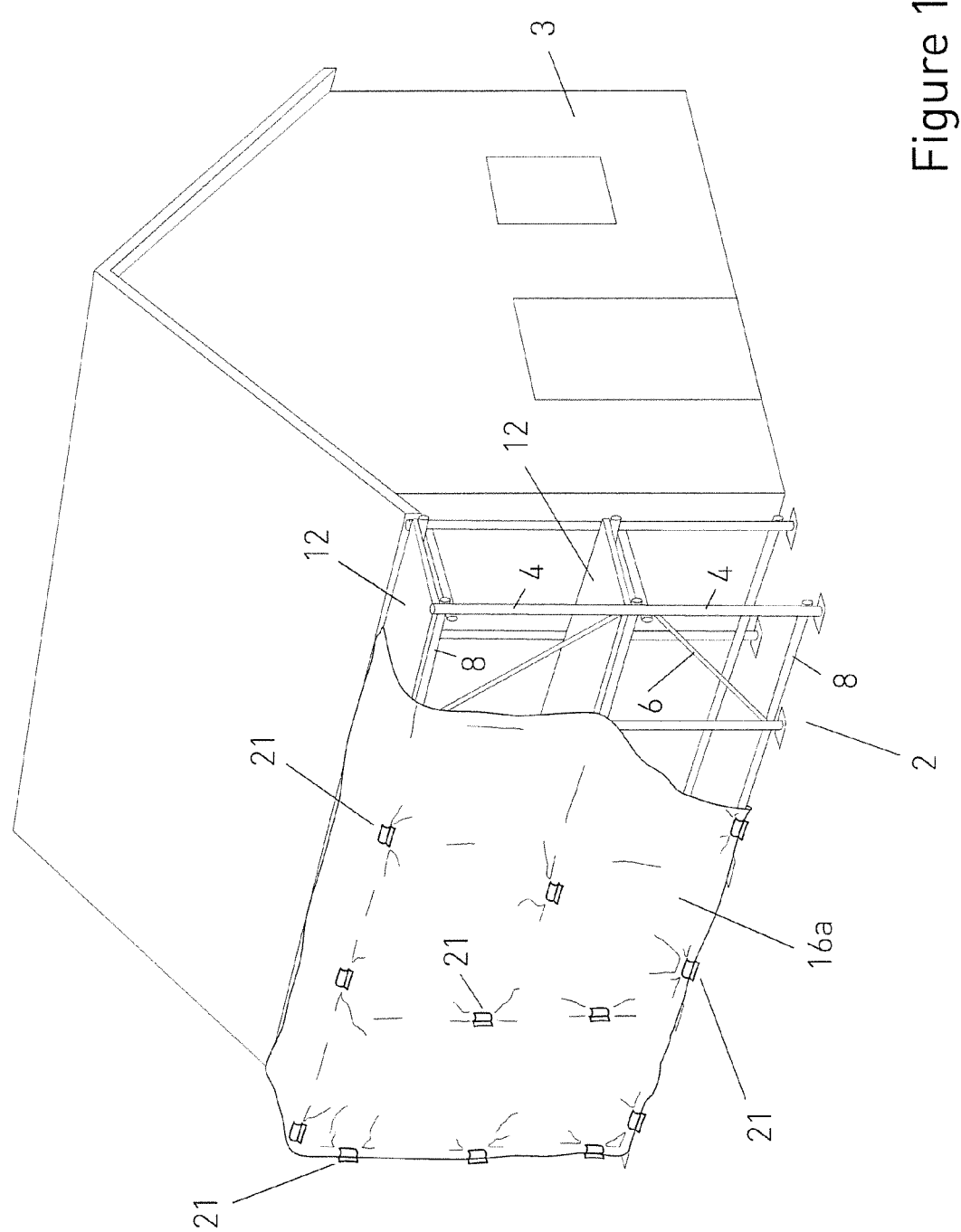
FIG. 1 is a perspective view depicting a prior art embodiment of a scaffolding system shown adjacent a building with the scaffolding system having fabric shrouding secured thereto and held by a series of clamps.

Referring to FIG. 1, a scaffolding system 2 is shown in a typical application adjacent a building structure 3 where the system can comprise a series of tubular scaffolding support members, such as tubular legs 4, tubular cross braces 6, and tubular horizontals 8. The particular system shown is a tube and clamp-type scaffolding system; however, it is also common to use a scaffolding frame system interconnected by braces or other means. Therefore, many different forms of the scaffolding system are possible. Scaffolding systems generally use tubular uprights, horizontals, and braces and provide a work platform 12 at different heights to allow a worker to perform a particular task at, or about, that height.

In some circumstances, it is desirable to provide a windbreak or weather break about a portion of the scaffolding system 2 and, for this, a fabric shroud 16a can be secured to scaffolding system 2. A series of clamps 21 can releasably secure fabric shroud 16a to any of the tubular uprights, horizontals or diagonals of an appropriate diameter at any point along their length.

Figure 2:
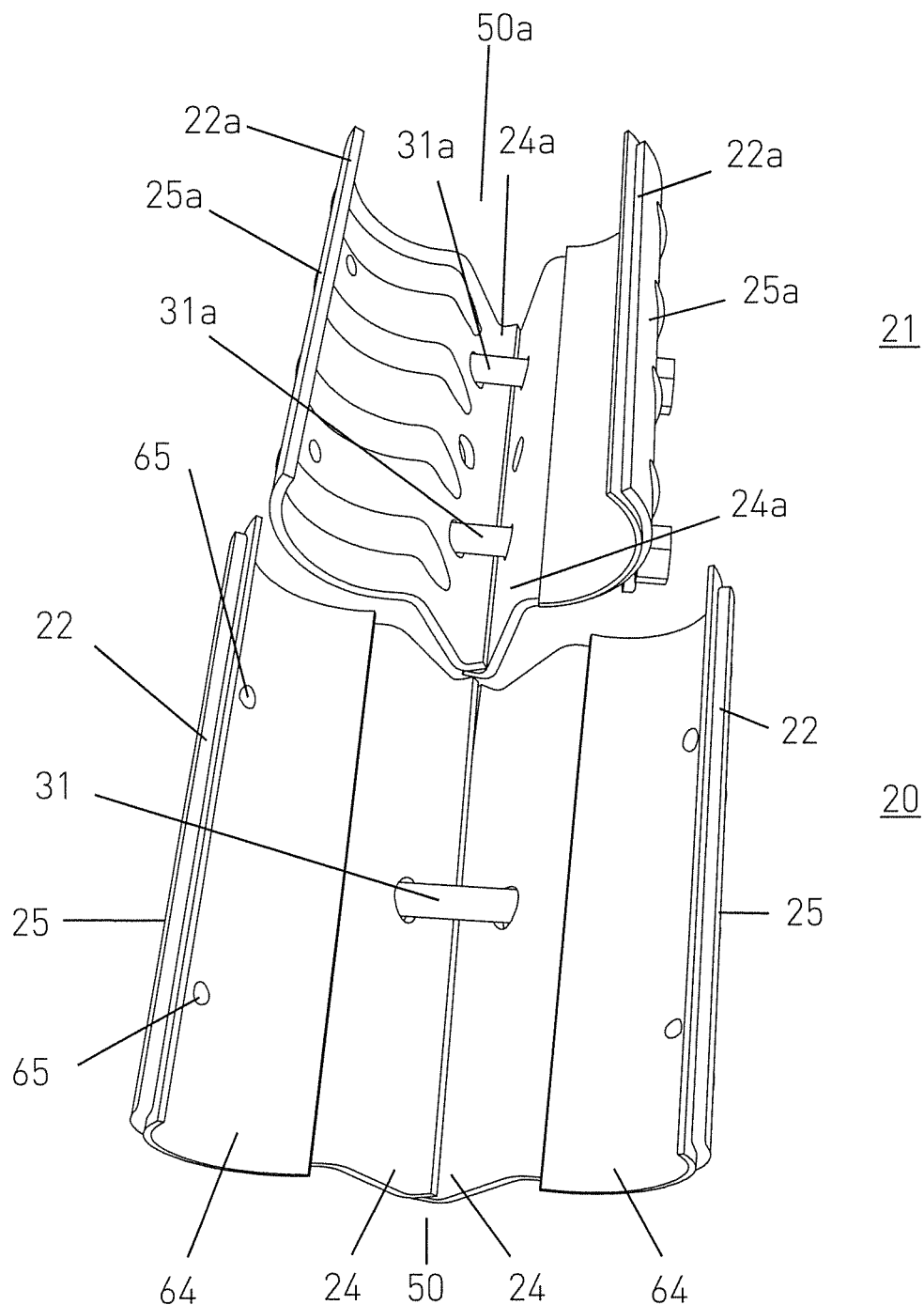
FIG. 2 is a front perspective view depicting an embodiment of a clamp in an open position as compared to a prior art embodiment of a clamp.

FIGS. 2 through 12 show embodiments of a clamp 20. FIG. 2 compares an embodiment of clamp 20 with an embodiment of prior art clamp 21 such as that described in U.S. Pat. No. 8,043,022. Each elongate clamp 20 can comprise opposed jaws 22 with opposed engagement flanges 24 provided to one side of the gripping arms 25 of the jaws 22. Gripping arms 25 can be shaped to engage the outer periphery of a support member 60 (also referred to as a scaffold member, tubular member, or upright member) which can be any of a tubular leg 4, tubular cross brace 6, or tubular horizontal 8 of scaffolding system 2. The prior art clamp 21 shown in FIG. 2 has opposed jaws 22a with opposed engagement flanges 24a provided to one side of the gripping arms 25a of the jaws 22a. However, prior art clamp 21 has two pins 31a and two wedges (not shown).

Referring to FIGS. 3 through 7, pin and wedge combination 28 can be provided at substantially the middle of engagement flanges 24, and can be used to draw jaws 22 into an engagement with a support member 60 to trap the fabric of shroud 16 between the jaws 22 and the support member 60. In some embodiments, pin 31 can be a double-headed pin that has a trapped first wedge 32 and second wedge 33 secured thereon at opposite ends. Both first wedge 32 and second wedge 33 can comprise an elongate slot 34 which can allow for movement of the wedge along pin 31 with a head of pin 31 engaging either side of slot 34. With this arrangement wedges 32, 33 can be brought to an open (or release) position of FIGS. 2 to 4 to allow jaw 22 to open and provide a relatively wide elongate opening 50. This can allow jaws 22 to be placed on either side of support member 60 with fabric shroud 16 located interior of jaws 22.

In some embodiments, pin 31 can comprise a length of approximately three and a half inches with a nut positioned approximately seven-eighths of an inch (including the length of the nut) from either end of pin 31. In some embodiments, a portion of the length of pin 31 outside of engagement flanges 24, of approximately two and five-eighths inches, can be available for the inclusion of washers and the wedges. In some embodiments, opening 50 can be approximately three and one-quarter inches across, thereby allowing a shroud 16 of heavy material to be clamped to a standard support member 60 as would be known to one skilled in the art. By comparison, prior art clamps would be limited to an opening 50a of approximately two and one-quarter inches across and unable to clamp a shroud 16 of heavy material to a standard support member 60 as would be known to one skilled in the art.

In some embodiments, wedges 32, 33 can be standard wedges known to one skilled in the art, which can be approximately five inches in length. The thickness of wedges can be approximately one-half inch for the thinner end and approximately seven-eighth inches for the thicker end.

Figure 3:
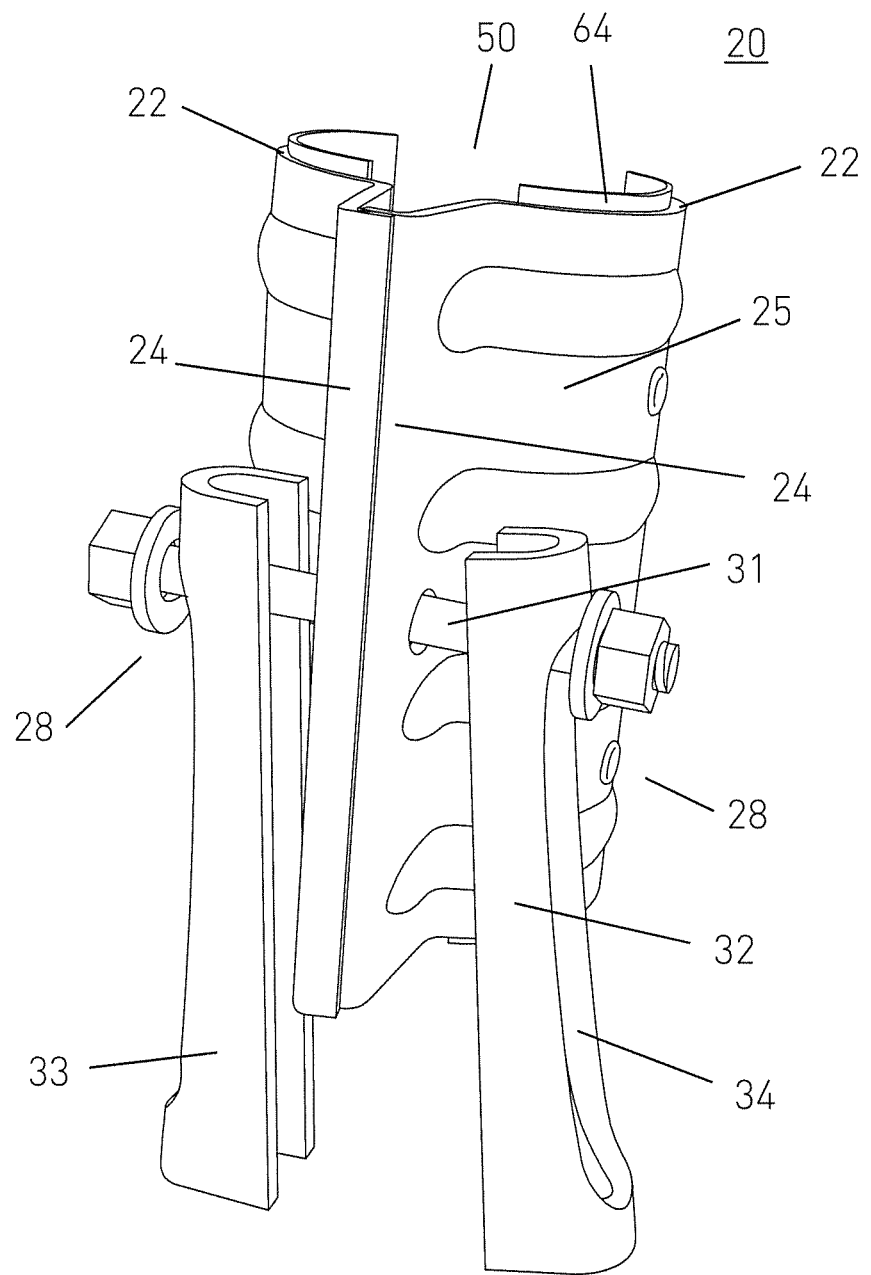
FIG. 3 is a rear perspective view depicting an embodiment of the clamp of FIG. 2 in an open position.
Figure 4:
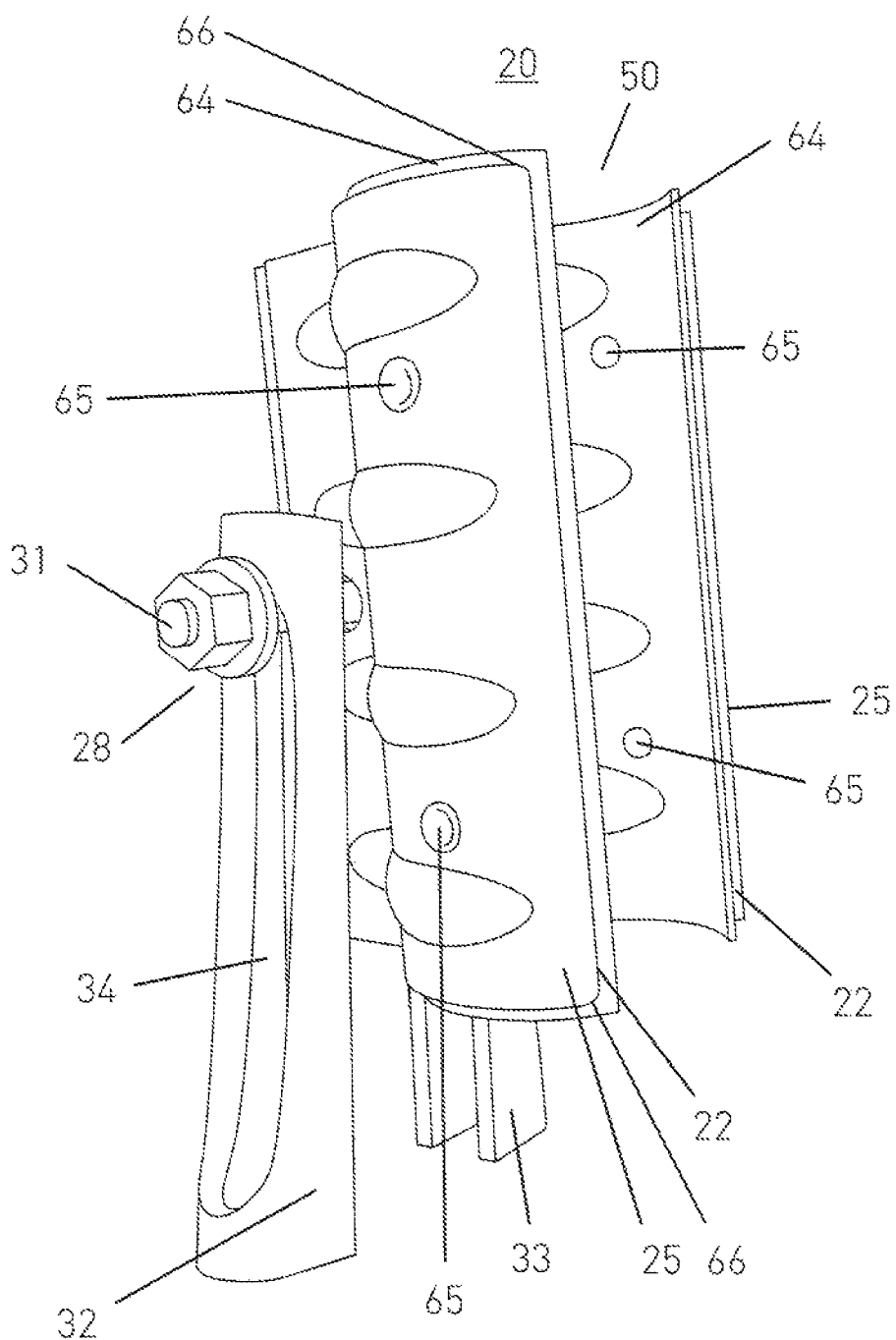
FIG. 4 is a side perspective view depicting an embodiment of the clamp of FIG. 2 in an open position.
Figure 5:
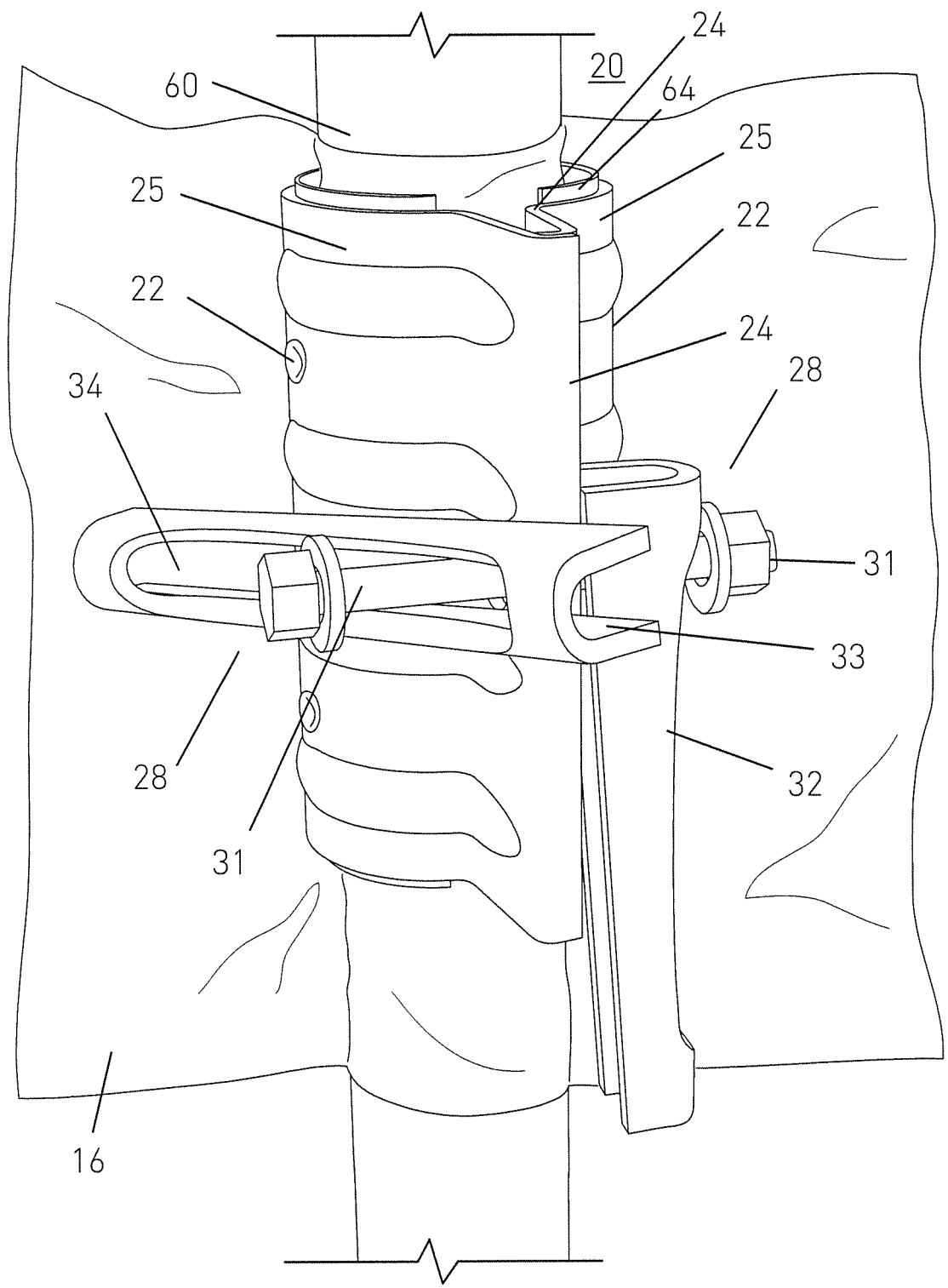
FIG. 5 is a rear perspective view depicting an embodiment of a clamp in a closed position in engagement with a shrouding and a support member maintaining the shrouding in engagement with the support member.
Figure 6:
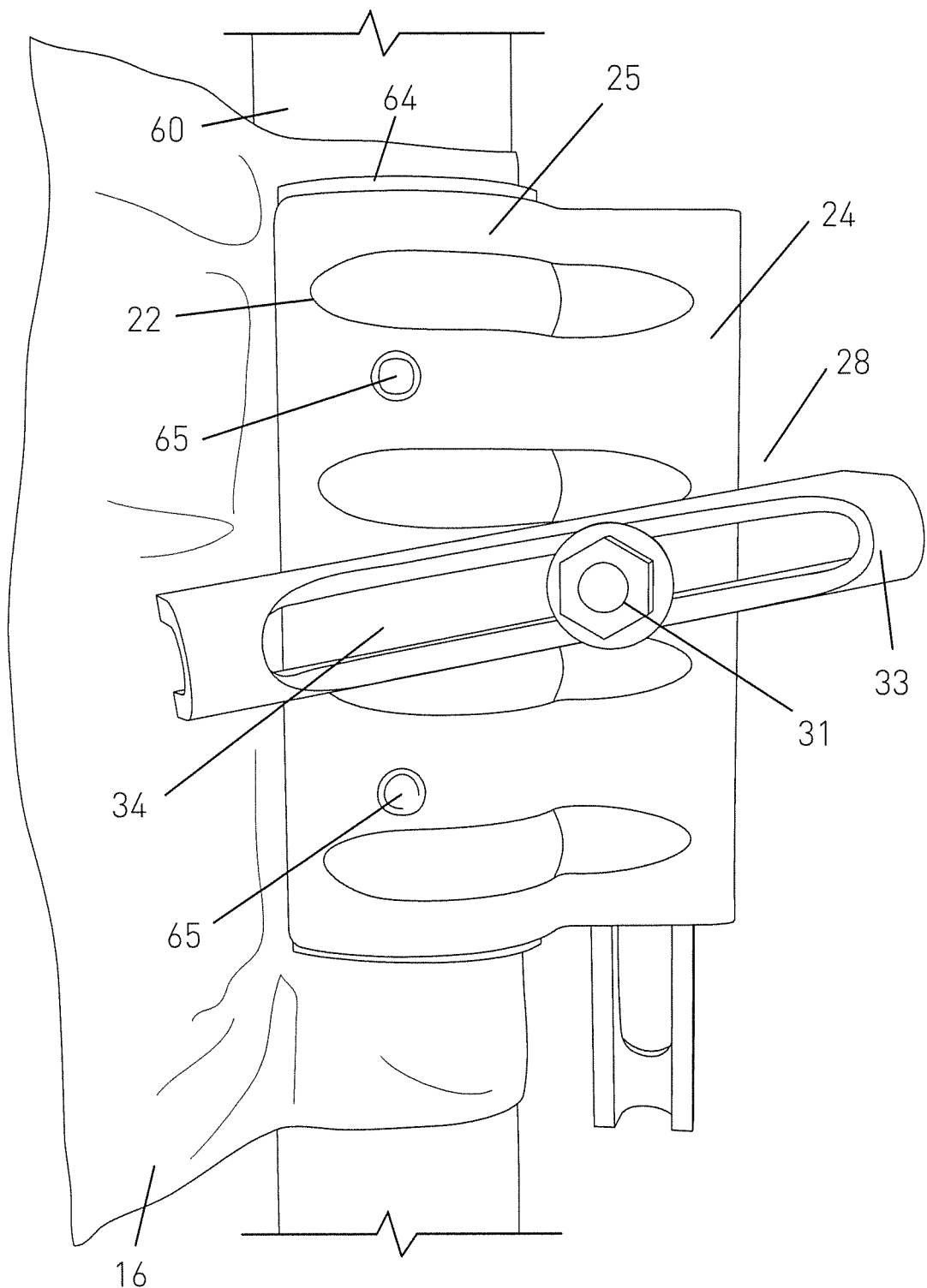
FIG. 6 is a side perspective view depicting an embodiment of the clamp of FIG. 5.
Figure 7:
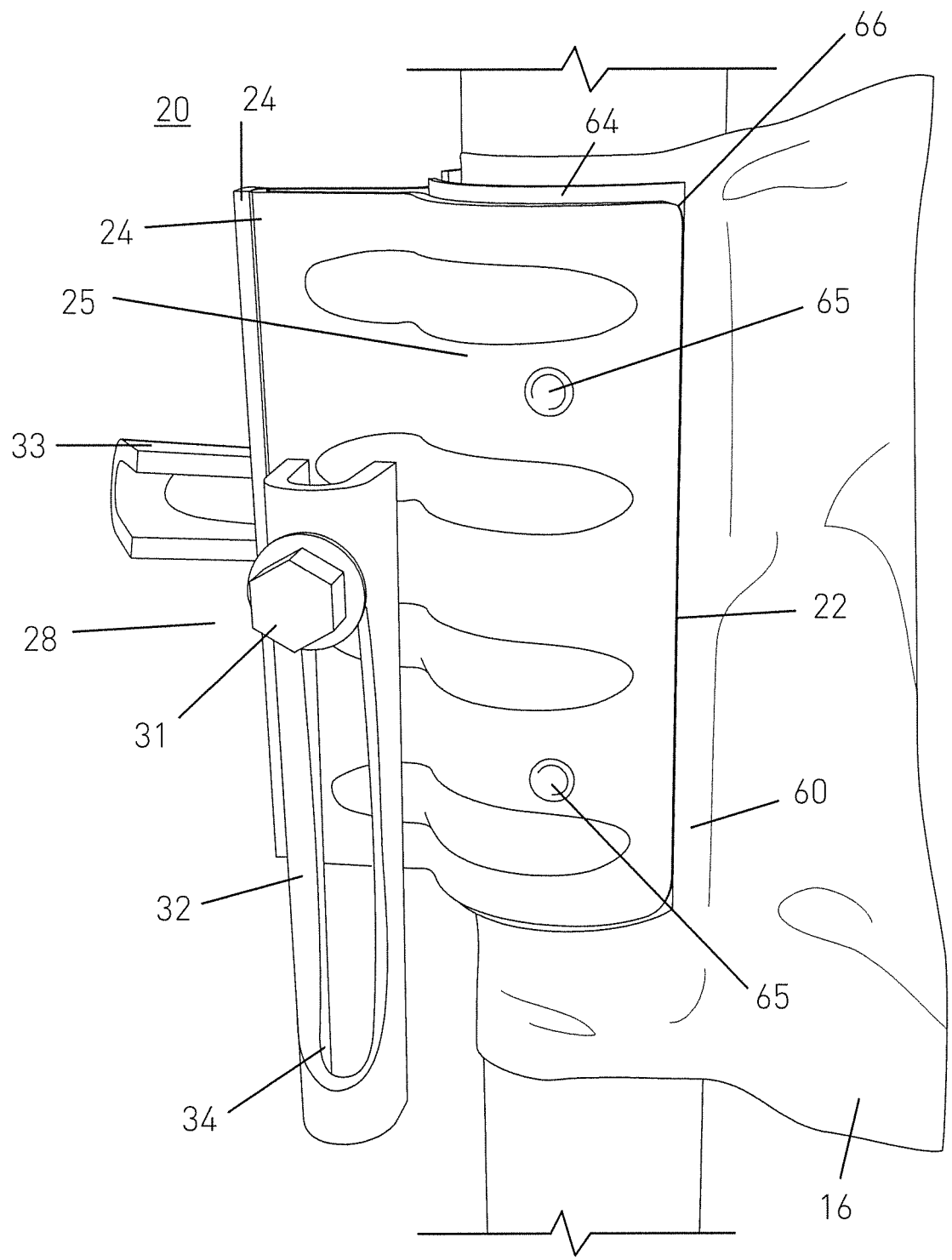
FIG. 7 is a side perspective view depicting an embodiment of the clamp of FIG. 5 from the other side.
Figure 8:
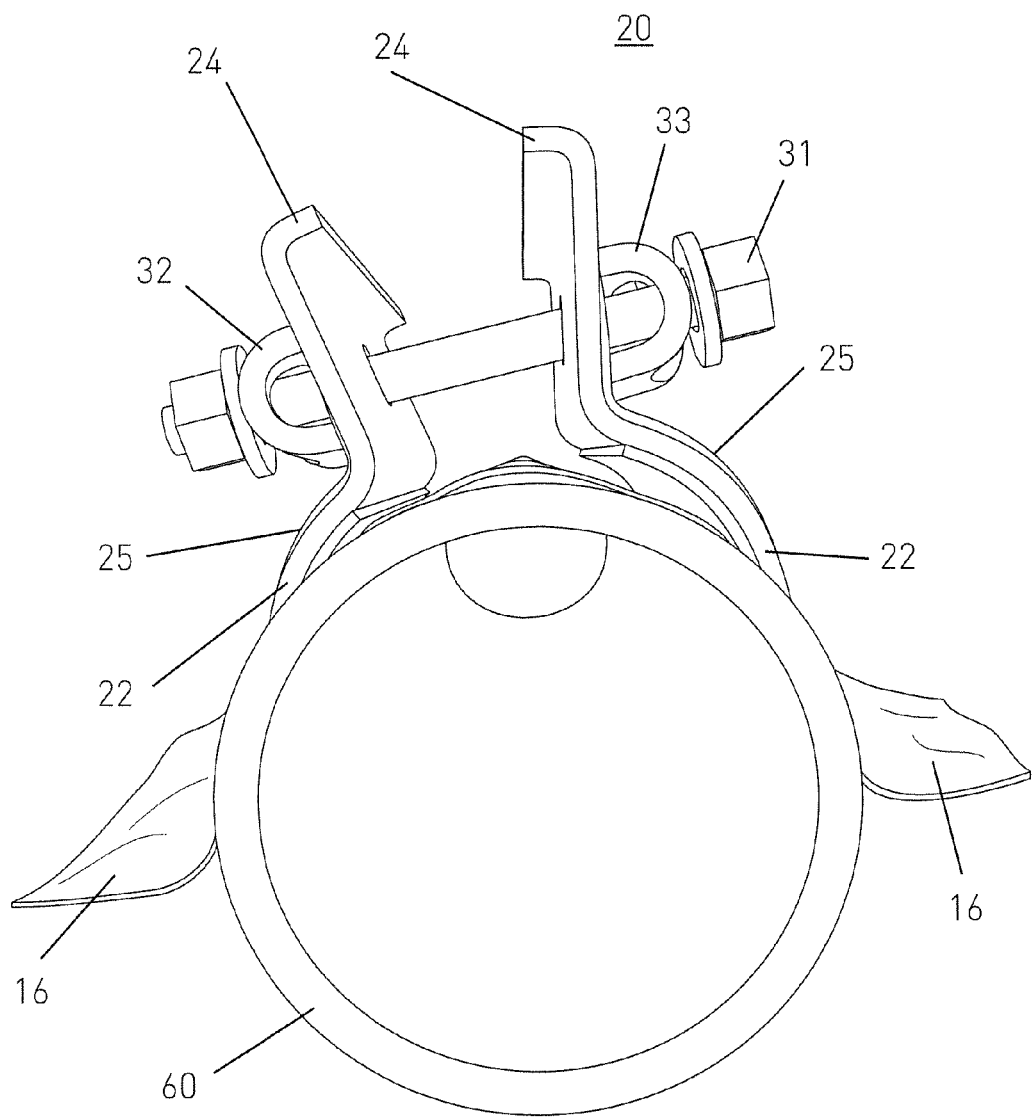
FIG. 8 is a top plan view depicting an embodiment of a clamp in an open position about to engage the shrouding and the support member to maintain the shrouding in engagement with the support member.

Embodiments of clamp 20 are shown in FIGS. 3 and 4 prior to the securement to a support member 60. As can be seen, wedges 32 and wedge 33 are in the released position, and jaws 22 are opened to a relatively wide position for engagement on either side of support member 60. FIGS. 5 to 7 show how shroud 16 can be partially wrapped around support member 60 and clamp 20 is applied to support member 60 to secure shroud 16 to support member 60.

In some embodiments, one or both of the jaws 22 can be lined with a liner layer 64 of resilient compressible material to separate the material of clamp 20 (for example, metal) from the fabric of shroud 16. Liner 64 can also provide some resilient deformation as the jaws are secured about support member 60. FIGS. 5 to 7 also illustrate that liner 64 can extend to the open edge of the respective jaw 22. In some embodiments, liner 64 can also extend beyond the upper or lower jaw edge to further protect the fabric shroud if desired. Liner 64 is shown as being secured to jaws 22 by rivets 65; however, it would be understood by one skilled in the art that any fastening or attachment means, such as glue, metal fasteners, hook and loop fasteners, or any other suitable means, can be used.

The secured arrangement is shown in FIGS. 5 to 7. In this embodiment, it can be seen that first wedge 32 has been driven vertically downward and second wedge 33 has been driven horizontally forward towards support member 60, thereby drawing the two engagement flanges 24 towards one another and forces movement of jaws 22 towards one another to lock clamp 20 on support member 60. Wedges 32, 33 can be struck by a hammer, or similar tool, to affect the drawing of the engagement flanges 24 towards one another. It would be understood by one skilled in the art that first wedge 32 could be driven horizontally and second wedge 33 could be driven vertically without departing from the function of clamp 20. In addition, it would be understood by one skilled in the art that the horizontally driven wedge could be driven before driving the vertically driven wedge, or that the opposite could be true. It would also be understood that if support member 60 is in a horizontal or diagonal position, instead of vertical, to close clamp 20, one wedge can be driven towards support member 60 while the other wedge can be driven substantially parallel to support member 60.

Terms such as 'horizontal', 'vertical', 'parallel, 'perpendicular', 'towards', 'away', 'upwards', 'downwards', 'forwards', and 'backwards' are understood to mean approximate relative positions and directions, and not words of precision.

Wedges 32, 33 can also allow simple release of clamp 20 from support member 60 when required. A worker can strike the edge of the vertical wedge upwards with a hammer, or similar tool, and the wedge can move on pin 31 and affect the appropriate release. By only having to loosen the vertical wedge, a worker is not required to strike horizontal wedges away from the shroud to loosen clamp 20. Striking horizontal wedges away from the shroud with a hammer, or similar tool, can lead to damage of shroud 16. It is of note that FIG. 5 of U.S. Pat. No. 8,043,022 implies that the prior art clamp 21 can function by locking with both wedges in a vertical position. In practice, this configuration does not work to secure a shroud to a support member 60 as opening 50a is not closed to sufficient dimension to frictionally engage shroud 16 and support member 60. As would be known to one skilled in the art, the dimensions of wedges 32, 33 do not allow for sufficient pressure to be placed onto opposed jaws 22 to lock prior art clamp 21 in place. Prior art wedges 32, 33 are standard wedges known to one skilled in the art, which can be approximately five inches in length. The thickness of prior art wedges can be approximately one-half inch for the thinner end and approximately seven-eighth inches for the thicker end. In any event, the use of a two vertical wedge and two pin system as disclosed in U.S. Pat. No. 8,043,022 is more complicated and onerous to manufacture and use than that of clamp 20 of present disclosure.

Figure 9:
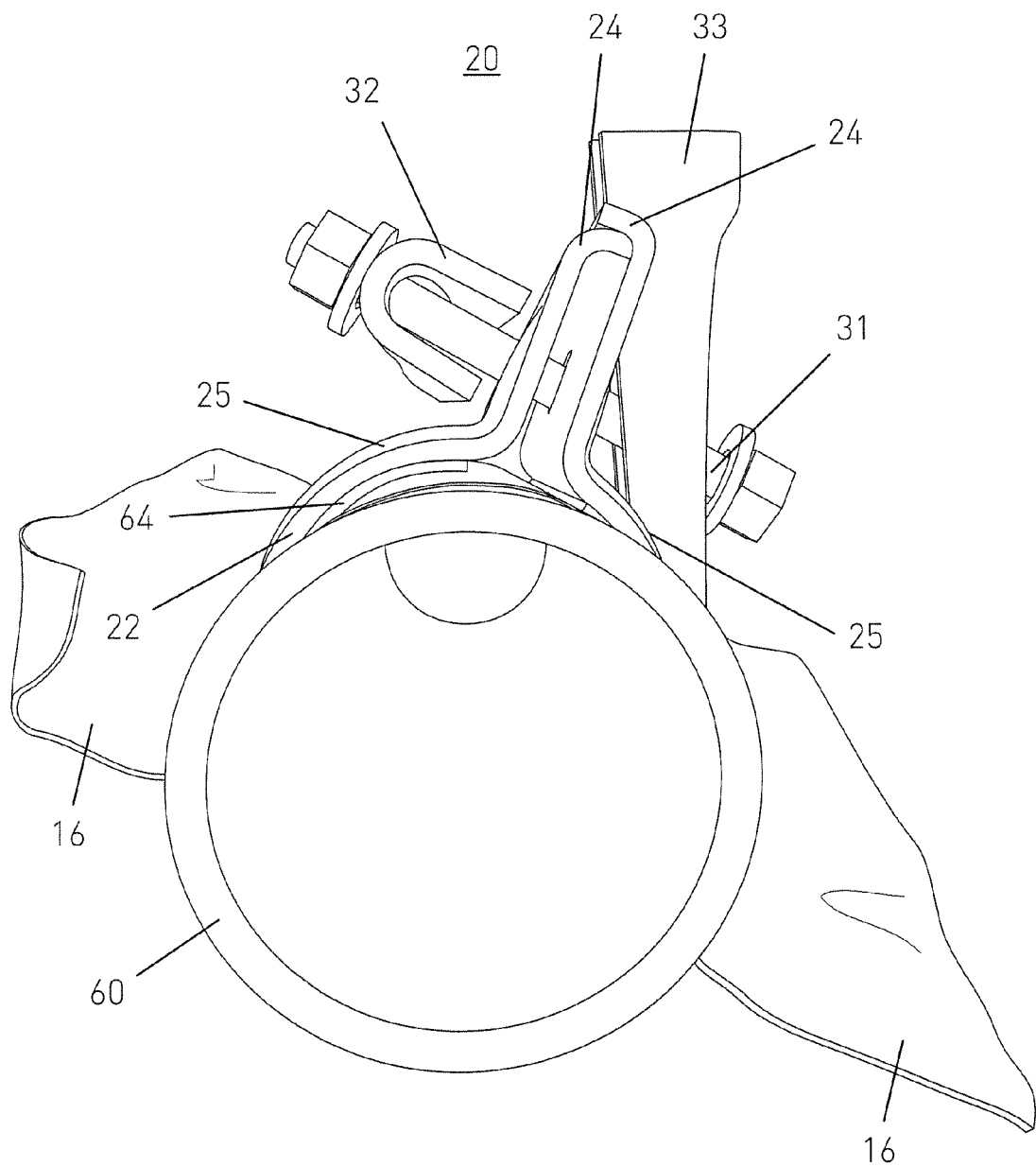
FIG. 9 is a top plan view depicting an embodiment of a clamp in a closed position in engagement with a shrouding and a support member maintaining the shrouding in engagement with the support member.

FIG. 8 again shows the opening of an embodiment of clamp 20 to position clamp 20 and shroud 16 about support member 60 in preparation for closing of clamp 20. FIG. 9 shows the closing of clamp 20 and locking of clamp 20 to support member 60.

Clamp 20 can be elongated to provide increased securement of shroud 16 along a substantial portion thereof to support member 60 in order to distribute any forces exerted on the shroud 16 due to wind or otherwise. It can be important to provide effective securement of shroud 16 to avoid tearing thereof. The use of liner 64, rounded corners 66 of clamp 20 edges, and the elongation of clamp 20 to provide a substantial clamping in the length of the support member 60, can be particularly effective.

Figure 10:
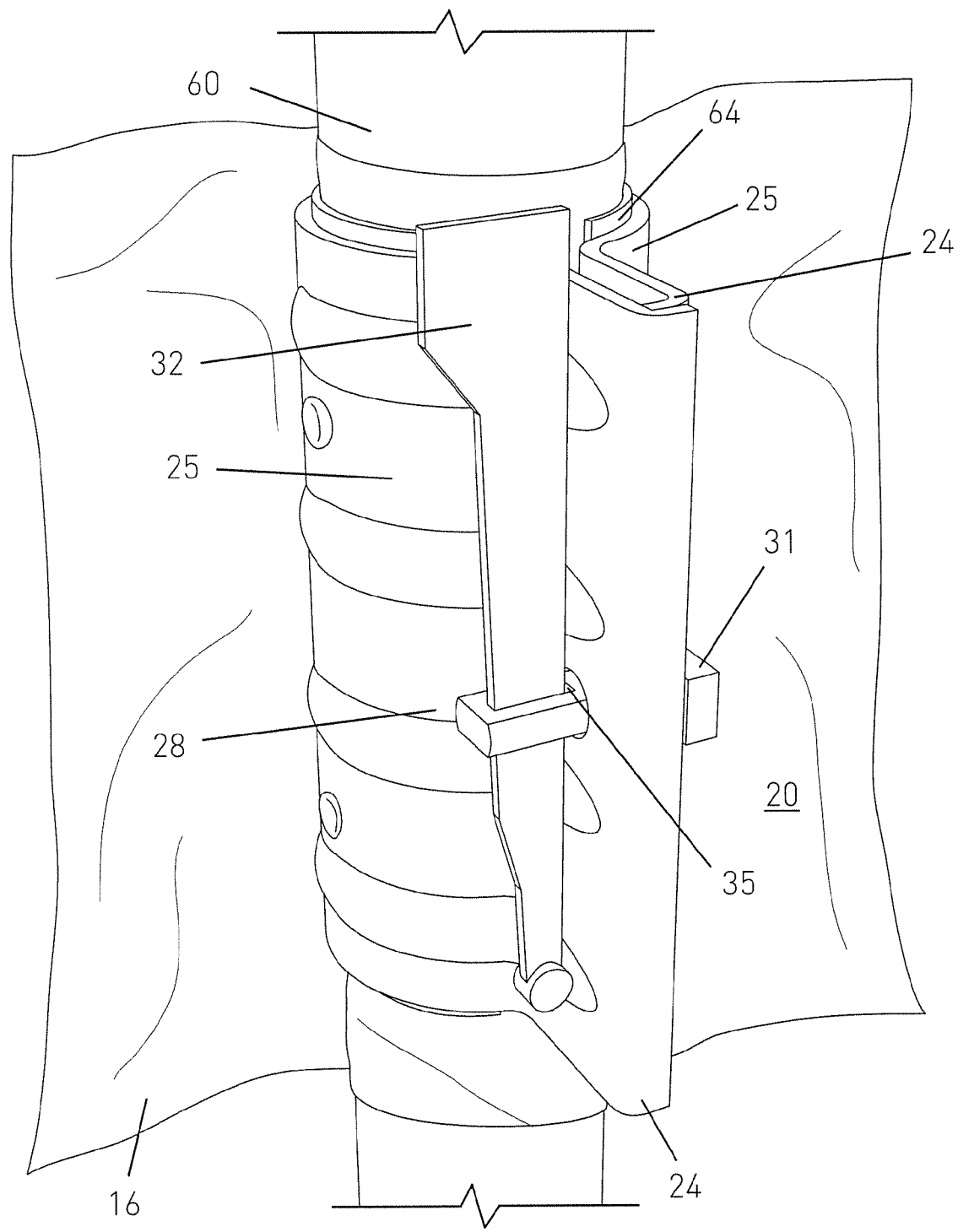
FIG. 10 is a rear perspective view depicting an embodiment of a clamp in a closed position in engagement with a shrouding and a support member maintaining the shrouding in engagement with the support member.
Figure 11:
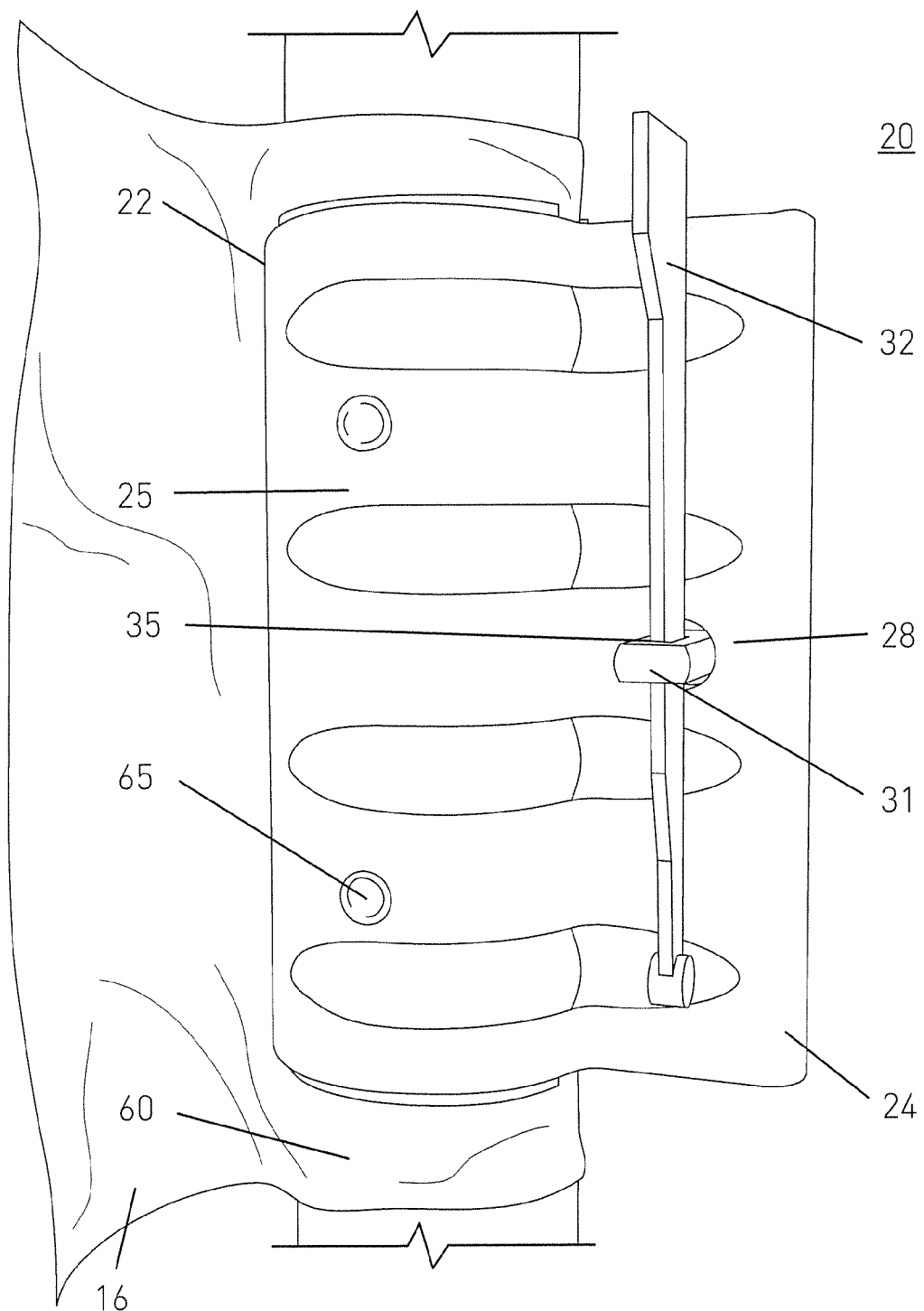
FIG. 11 is a side perspective view depicting an embodiment of the clamp of FIG. 10.
Figure 12:
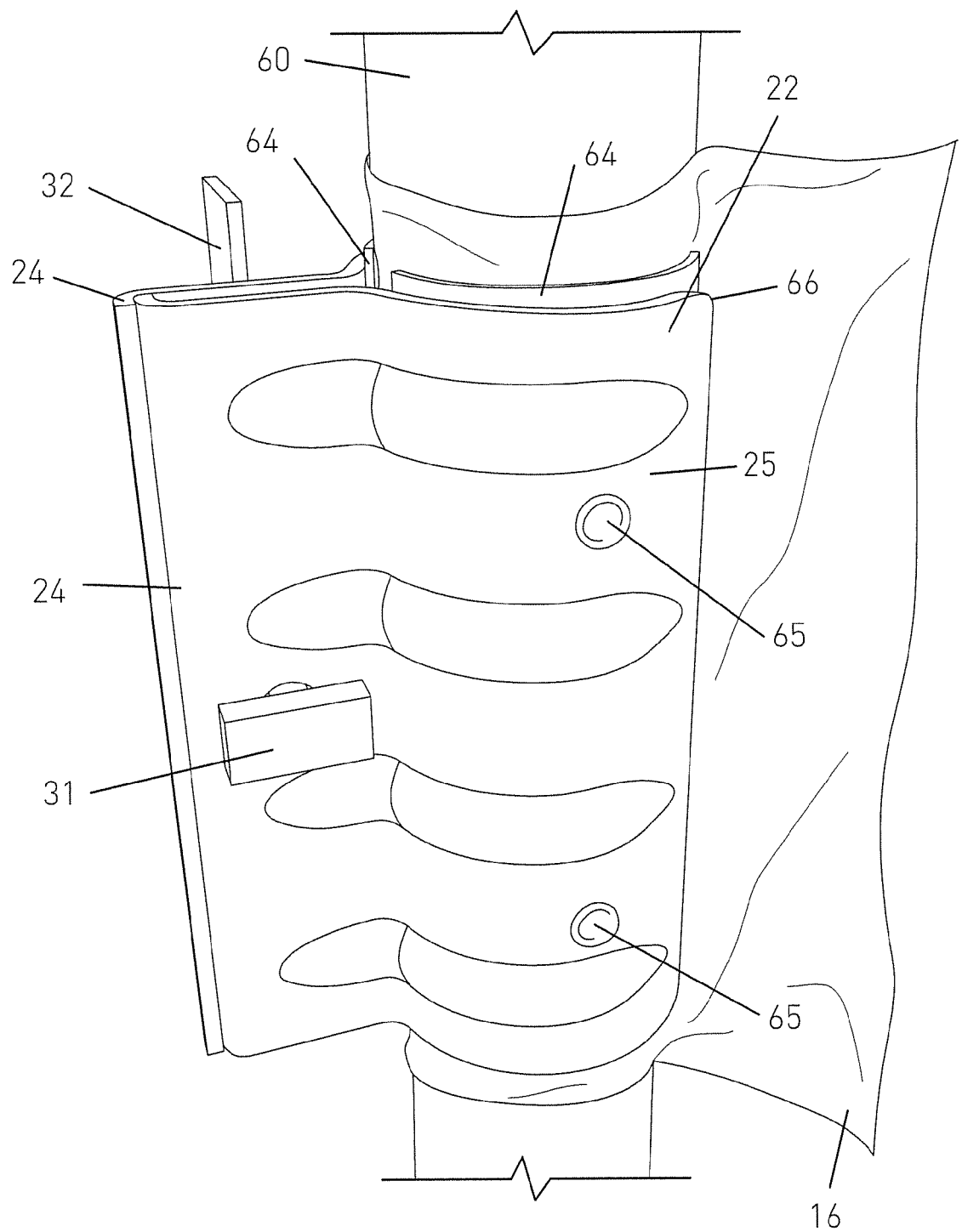
FIG. 12 is a side perspective view depicting an embodiment of the clamp of FIG. 10 from the other side.

Referring now to FIGS. 10 to 12, further embodiments of clamp 20 are shown. Pin and wedge combination 28 can be provided at substantially the middle of engagement flanges 24 and can be used to draw jaws 22 into an engagement with a support member 60 and to trap the fabric of shroud 16 between the jaws 22 and the support member 60. In some embodiments, pin 31 can comprise a head of pin 31 engaging one engagement flange and an elongate slot 35 which can trap first wedge 32 to allow for movement of the wedge through pin 31. First wedge 32 can be parallel to support member 60, for example vertical for a vertical support member, and can be driven vertically downward thereby drawing the two engagement flanges 24 towards one another and forces movement of jaws 22 towards one another to lock clamp 20 on support member 60. First wedge 32 can be driven vertically upward to affect the appropriate release. Wedge 32 can be struck by a hammer, or similar tool, to affect the drawing of the engagement flanges 24 towards or apart from one another.

The scope of the claims should not be limited by the embodiments as set forth in the examples herein, but should be given the broadest interpretation consistent with the description as a whole.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. An elongate scaffold clamp for use in securing a shroud material to a tubular scaffold member, said clamp comprising:
   a first jaw member having a first engagement flange and first gripping arm;
   a second jaw member opposing the first jaw member and having a second engagement flange and second gripping arm, wherein the first and second gripping arms form an opening to receive said tubular scaffold member therebetween and the first engagement flange is positioned in an overlapping relationship with the second engagement flange opposite the opening;
   a single pin having a first and second end, the single pin extending though corresponding apertures in the first and second engagement flanges for securing said first and second jaw members in opposed relation;
   a first wedge adjustably mounted on the first end of the single pin; and
   a second wedge adjustably mounted on the second end of the single pin opposite the first wedge;

each wedge configured to separately move between a substantially horizontal position and a substantially vertical position;

wherein the first and second wedges are independently movable about and along the single pin between a release position where the first and second jaw members can be separated and removed from the tubular scaffold member and a closed position where said first and second jaw members are drawn towards one another to effect gripping of said tubular scaffold member inserted between the first and second gripping arms, wherein the closed position comprises the first wedge being placed in the substantially horizontal position and the second wedge being placed in the substantially vertical position.

2. An elongate scaffold clamp as claimed in claim 1 wherein each of said first and second wedges includes a center slot running between opposed ends of said wedge and wherein the pin passes through each center slot and is captured.

3. An elongate scaffold clamp as claimed in claim 1 further comprising a resilient compressive layer lining in each jaw defining an interior surface of each jaw.

4. An elongate scaffold clamp as claimed in claim 3 wherein said resilient compressive layer extends beyond the interior surface of each jaw.

5. An elongate scaffold clamp as claimed in claim 3 wherein said resilient compressive layer is secured to the jaw members by rivets.

6. An elongate scaffold clamp as claimed in claim 1 wherein said clamp is reversible in orientation.

7. An elongate scaffold clamp as claimed in claim 1 wherein said jaw members have rounded edges.

8. An elongate scaffold clamp as claimed in claim 1 wherein said pin is a double-headed pin.

9. An elongate scaffold clamp as claimed in claim 1 wherein said pin has a length of approximately three and a half inches.

10. An elongate scaffold clamp as claimed in claim 1 wherein the opening formed between the jaw members comprises a distance of approximately three and one-quarter inches across.

11. An elongate scaffold clamp as claimed in claim 1 wherein said first and second wedges, each of which have a first and second end having a length of approximately five inches therebetween, and a thickness of approximately one-half inch at the first end and approximately seven-eighth inches at the second end.

\* \* \* \* \*